UNITED STATES PATENT OFFICE.

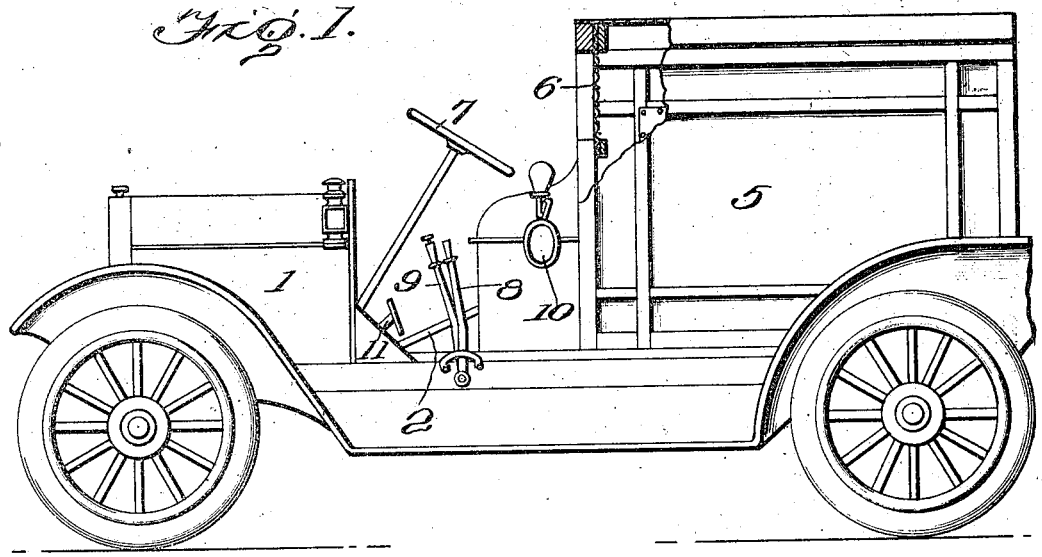
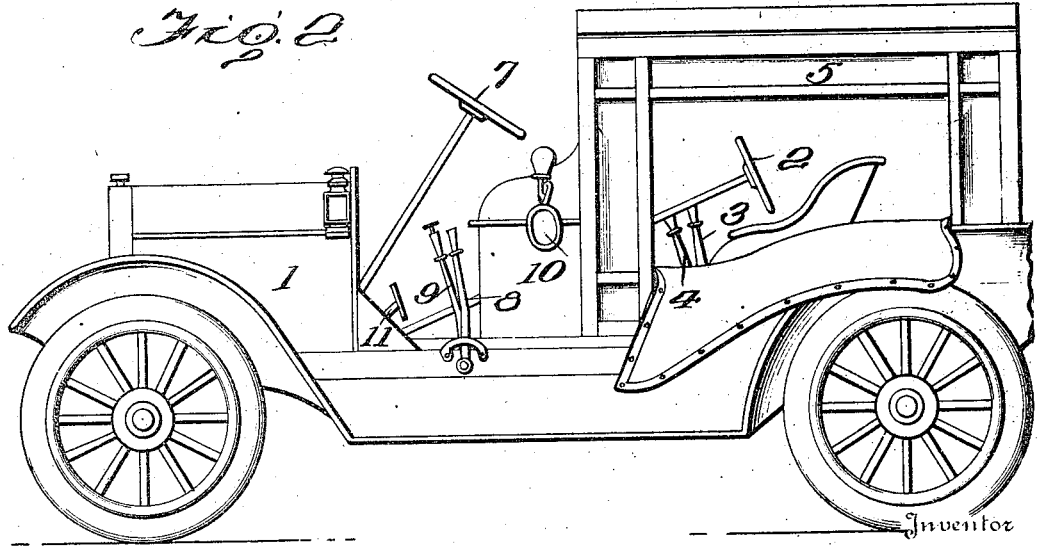

ROBERT M. T. JOHNSON, OF BINGHAMTON, NEW YORK.

MOTOR-VEHICLE BODY.

1,230,715.   Specification of Letters Patent.   Patented June 19, 1917.

Application filed June 22, 1916. Serial No. 105,245.

*To all whom it may concern:*

Be it known that I, ROBERT M. T. JOHNSON, a citizen of the United States of America, residing at Binghamton, in the county of Broome and State of New York, have invented certain new and useful Improvements in Motor-Vehicle Bodies, of which the following is a specification.

My invention relates to an improvement in motor vehicle bodies, and has for its object, the production of a motor vehicle which is capable of being steered from an invisible position within the body of the car, and is further provided with a dummy steering and controlling apparatus in the customary place, whereby an illusion is created that the car, when in motion is under no one's control.

The uses to which my invention may be put are practically limitless, including among others, its use as an advertising or exhibition medium of all kinds, such as for circus use, in both hippodrome and street parades. It can be very well used in the production of motion pictures and stage productions.

The primary object of the invention is to attract attention by deception, and to furnish thrills in productions of various kinds, due to the fact, as previously set forth, that the motor vehicle is apparently running away and guideless.

My invention may be more plainly understood by a study of the accompanying drawings, in which—

Figure 1 is a side elevation of a motor vehicle with a body in position and a dummy steering wheel and controlling mechanisms in place.

Fig. 2 is a side elevation of the same with a curtain down disclosing the position of the real steering and controlling mechanism.

A motor vehicle 1, which obviously may be of any construction, has the ordinary steering wheel 2 and controlling levers 3 and 4, and the usual clutch pedals not shown, is adapted to receive a false body 5. This body 5 may be fastened to the car by any approved methods, but I prefer to use a number of bolts, not shown, whereby it is rigidly affixed to the vehicle.

A screen 6 is in the front of the body through which the driver can easily see the road, so that he can drive the car in safety. Additional port holes, or observation screens, not shown, may be placed in the side of the body for the same purpose, the whole so arranged that a person may sit within a car and drive the car without any of the spectators suspecting that there is a driver therein.

In front of the body 5 are removably mounted a false, or dummy steering wheel 7, dummy controlling levers 8 and 9, a false horn 10, and false foot pedals 11. In this connection it will readily be apparent that it is not necessary that the auxiliary controlling means be false, but that a dual system of control in which each system is fully capable of controlling the car might be used.

Hence I do not wish to be limited to the false or dummy controlling means. This would, of course, be a much more expensive and difficult construction to complete, yet I wish to have that considered as coming within the purview of my invention.

It will be obvious, that such a car used, for instance, as an advertising medium would attract attention and arouse unbounded curiosity.

It will be obvious that this body would be as practicable for an electrically propelled vehicle as for those propelled by internal combustion engines, or other propelling means, and hence I do not wish to be limited to the precise structure set forth, but—

I claim:

1. The combination with a motor-driven chassis, of concealed controlling means therefor, false controlling means exposed on said chassis, and means for concealing a driver, whereby an illusion is created that the vehicle is driverless and guideless.

2. The combination with a motor driven vehicle, of a body mounted thereon having means therein through which the driver of the car may see, controlling means within the body, false steering and false controlling means mounted on said vehicle, whereby a driver may control the vehicle from within said body and create an illusion that the vehicle is driverless and guideless.

3. An advertising or like device comprising in combination a motor driven chassis with driving and controlling means thereon, means for concealing the driver of said chassis, dummy driving and controlling mechanisms, so placed as to create an illusion that the chassis is driverless and guideless.

4. The combination with a chassis, of a body thereon, controlling means within the body, apparent controlling means without the body so arranged that the driver operates the controlling means within the body, and the absence of an operator for the apparent controlling means creates an illusion that the car is driverless and guideless.

In testimony whereof I affix my signature.

ROBERT M. T. JOHNSON.